United States Patent
Andersson et al.

(10) Patent No.: US 7,796,556 B2
(45) Date of Patent: Sep. 14, 2010

(54) METHOD AND ARRANGEMENT FOR HANDLING SOFT HANDOVER IN A MOBILE TELECOMMUNICATION SYSTEM

(75) Inventors: Yngve Andersson, Alta (SE); Jan Anders Milen, Nacka (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 749 days.

(21) Appl. No.: 10/599,798

(22) PCT Filed: Apr. 13, 2004

(86) PCT No.: PCT/SE2004/000568

§ 371 (c)(1),
(2), (4) Date: Oct. 10, 2006

(87) PCT Pub. No.: WO2005/101890

PCT Pub. Date: Oct. 27, 2005

(65) Prior Publication Data

US 2007/0207822 A1 Sep. 6, 2007

(51) Int. Cl.
*H04W 4/00* (2009.01)
(52) U.S. Cl. ............... 370/332; 455/442; 455/438; 370/335
(58) Field of Classification Search ............ 370/333
See application file for complete search history.

(56) References Cited

U.S. PATENT DOCUMENTS

| | | | | |
|---|---|---|---|---|
| 6,983,149 B2 * | 1/2006 | Lindquist et al. | ............ | 455/436 |
| 7,031,277 B2 * | 4/2006 | Choi et al. | ............ | 370/331 |
| 7,248,889 B2 * | 7/2007 | Schwarz et al. | ............ | 455/522 |
| 7,308,264 B2 * | 12/2007 | Stern-Berkowitz et al. | .. | 455/442 |
| 7,324,479 B2 * | 1/2008 | Hur | ............ | 370/332 |
| 7,369,534 B2 * | 5/2008 | Amerga et al. | ............ | 370/350 |
| 2003/0078043 A1 | 4/2003 | Horwath | | |

FOREIGN PATENT DOCUMENTS

EP 1377101 A1 1/2004

OTHER PUBLICATIONS

"Issues with RRC CR 1478 on measurements" RP-020384 3GPP TSG-RAN meeting #16, Jun. 7, 2002.*
"Issues with RRC CR 1478 on measurements" *RP-020384* 3GPP TSG-RAN meeting #16; Jun. 2002.

* cited by examiner

Primary Examiner—Patrick N Edouard
Assistant Examiner—Jalaleddin Amirmokri
(74) Attorney, Agent, or Firm—Roger S. Burleigh

(57) ABSTRACT

The present invention relates to a method and arrangements for including a detected cell, i.e. a cell not identified by the network, in an active set, i.e. the set comprising the base stations simultaneously connected to the same mobile terminal in soft handover. The method comprises the steps of:— receiving a measurement report comprising a detected set cell from a mobile terminal located in a first cell:—providing (301) a list (L1) for the first cell in the network with cells not defined as neighbouring cells to the first cell, wherein the cells in the list (L1) are grouped based on their scrambling codes;—identifying (302) the scrambling code of the detected set cell;—creating (303) a temporary relation between one of the cells in the list (L1), having an identical scrambling code as the detected set cell, and one cell in the AS;—adding (304) the one of the cells in the list (L1), having an identical scrambling code as the detected set cell, to the active set.

6 Claims, 3 Drawing Sheets

| Scrambling code x | Scrambling code y | ... | Scrambling code z |
|---|---|---|---|
| Cell Ax: scr x | Cell Ay: scr y | . . | Cell Az: scr z |
| Cell Bx: scr x | Cell By: scr y | . . | Cell Bz: scr z |
| Cell Cx: src x | Cell Cy: scr y | . . | - |
| - | Cell Dy: scr y | . . | - |

METHOD AND ARRANGEMENT FOR HANDLING SOFT HANDOVER IN A MOBILE TELECOMMUNICATION SYSTEM

FIELD OF THE INVENTION

The present invention relates to a mobile telecommunication system.

In particular, the present invention relates to methods and arrangements for handling soft handover in a code division multiple access (CDMA) based mobile telecommunication system, e.g. a Universal Mobile Telecommunication system (UMTS).

BACKGROUND OF THE INVENTION

Handover in a mobile telecommunication system occurs when a call has to be passed from one cell to another as the mobile terminal moves between the cells. In a traditional "hard" handover, the connection to the current cell is broken, and then the connection to the new cell is established. Since all cells in a CDMA system use the same frequency, it is possible to establish the connection to the new cell before leaving the current cell. This is known as "soft" handover. Soft handovers require less power, which reduces interference and increases capacity. A mobile terminal in soft handover may be connected to two or more base stations simultaneously. In the uplink direction, the connected base stations receive the signals from the mobile terminal and the signals are combined in the network (e.g. in the radio network controller (RNC)), e.g. by means of selection combining. In the downlink direction, the mobile terminal receives signals from the connected base stations. The signals are combined in the RAKE receiver of the mobile terminal, e.g. by using Maximum ratio combining.

Each cell has a set of neighbouring cells and when the mobile terminal is in soft handover, the mobile terminal, also referred to as User Equipment (UE), is required to monitor the neighbouring cells transmitting on the same frequency. The mobile terminal is hence required to perform measurements on the neighbouring cells. Examples of different types of radio interface measurements are:

Intra-frequency measurements: measurements on downlink physical channels at the same frequency as the active set.

Inter-frequency measurements: measurements on downlink physical channels at frequencies that differ from the frequency of the active set.

Inter-RAT measurements: measurements on downlink physical channels belonging to another radio access technology than the current radio access network in UMTS, e.g. GSM.

The Active Set (AS) is defined as the set of base stations, also referred to as Node Bs, that the mobile terminal is simultaneously connected to. Cells which are not included in the active set, but are included in a cell info list (CELL INFO LIST), belong to the Monitored Set, and cells detected by the mobile terminal, which are neither in the CELL_INFO_LIST nor in the active set, belong to the Detected Set.

In many cases there are neighbouring cells that for different reasons are never included in the measurement order that is sent from the network to the mobile terminal. It is therefore possible for the mobile terminal to detect cells not being specified in the network (i.e. in the CELL_INFO_LIST), i.e. the detected set cells. Further, in release '99 of the 3GPP specification it is not mandatory for the mobile terminal to report the cell identity of the detected set cells even if the radio network has requested the mobile terminal to report that. It is only mandatory to report the scrambling code of the cell.

It is currently possible to order the mobile terminal to measure on maximum 32 cells per measurement purpose (e.g. intra and inter frequency and inter RAT). The intra frequency cells that are reported in the CELL_INFO_LIST to the mobile terminal are part of the above mentioned monitored set. If there is more than 32 neighbouring cells, the list is simply truncated and truncated cells will be part of the detected set together with all other cells that are not defined as neighbouring cells to the cells defined in the active set (AS).

Thus, it is desirable to be able to add the detected cells that are not already defined as neighbouring cells to the active set (AS).

When a mobile terminal send a measurement report of a detected set cell to the radio network, the radio network may add it to the AS only if it is defined as a neighbouring cell to any of the cells in the AS. A problem is that the cell identity may be unknown, it is therefore not possible to simply add the reported cell to the active set. According to release '99 of the 3GPP specification, it is not possible to require the mobile terminal to report the cell identity. The only way to identify the reported detected set cell if the cell identity is not received is the scrambling code, and it is therefore difficult for the radio network to know if it is possible to include the reported detected set cell in the AS as there can be several cells with the same scrambling code.

SUMMARY OF THE INVENTION

As mentioned above, it is desirable to include detected set cells in the active set. A problem is that it is often only possible to use the scrambling code to identify the detected set cells and several cells may have the same scrambling code.

It is thus an object with the present invention to provide a method and arrangements for solving the above described problem.

Embodiments of the present invention are defined by the dependent claims.

An advantage with the present invention is that the reported detected set cells may be used even without the knowledge of cell identity. The system will be partly self-tuning regarding neighbouring cell relations which means decreased need for neighbour cell planning and provides more robust mobility functionality in the network.

BRIEF DESCRIPTION OF THE DRAWINGS

FIG. 2 illustrates schematically a list according to the present invention.

DETAILED DESCRIPTION OF THE INVENTION

Figure 1:
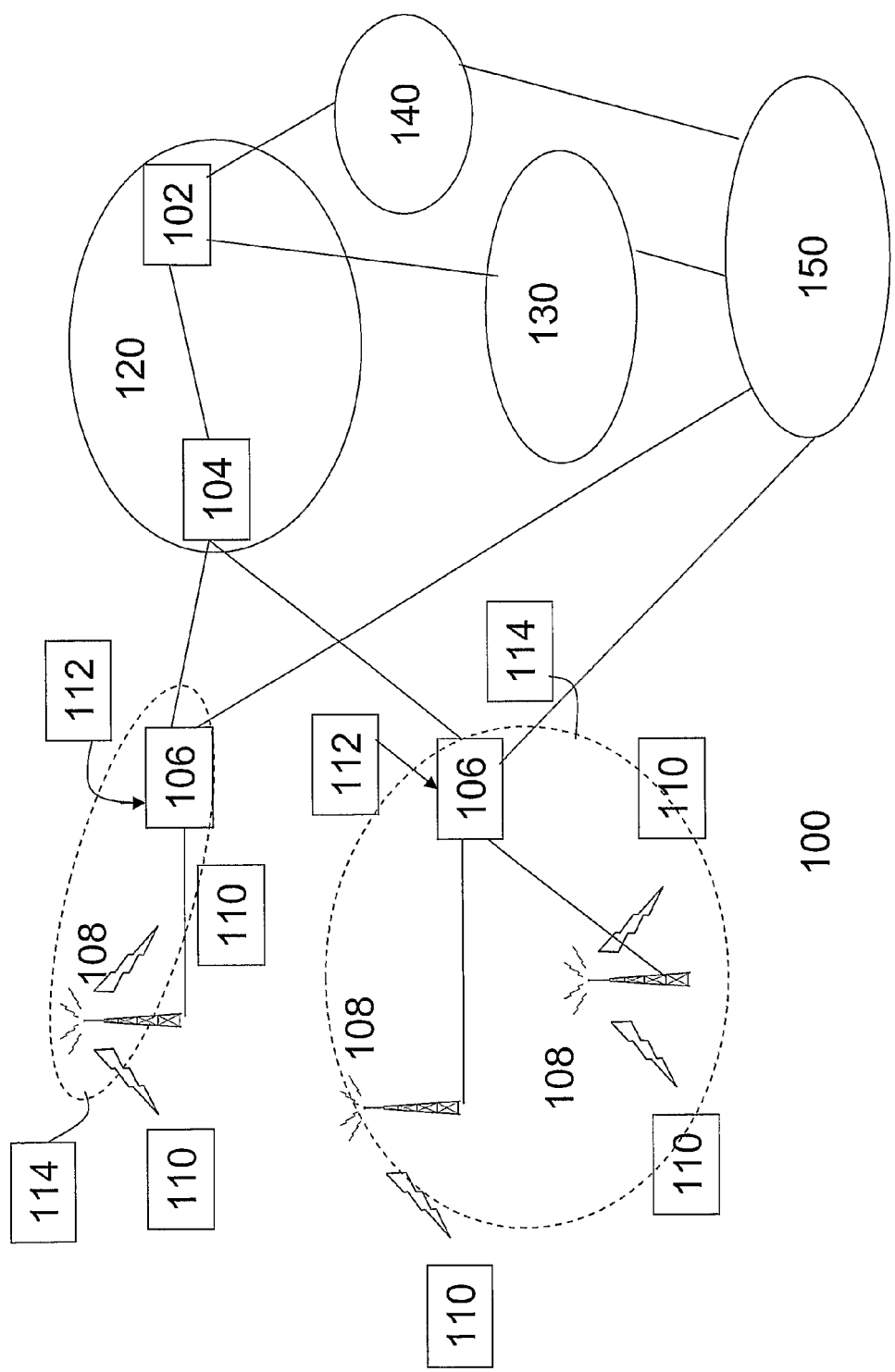
FIG. 1 illustrates a third generation mobile telecommunication system wherein the present invention may be implemented.

The present invention will now be described more fully hereinafter with reference to the accompanying drawings, in which preferred embodiments of the invention are shown. This invention may, however, be embodied in many different forms and should not be construed as limited to the embodiments set forth herein; rather these embodiments are provided so that this disclosure will be thorough and complete, and will fully convey the scope of the invention to those skilled in the art. In the drawings, like numbers refer to like elements.

The present invention may be implemented in a third generation mobile telecommunication system having a CDMA (e.g. Wideband CDMA) based radio access network as depicted in FIG. 1. FIG. 1 shows a mobile telecommunication system that comprises a first Core Network (CN) 120 comprising at least one Gateway GPRS Support Node (GGSN) 102 connected to at least one Serving GPRS Support Node (SGSN) 104. The first CN is connectable to other networks 130, 140, such as the PSTN or another mobile network, by means of the GGSN. The SGSN 104 is connectable via the Iu interface to a plurality of Radio Network Subsystems (RNS) 114. Each RNS 114 comprises a Radio Network Controller (RNC) 106 and at least one Node B, also referred to as Base Station (BS), 108 connected to the RNC 106 via the Iub interface. The RNCs control their connected Node Bs 108 and the Node Bs comprise means for wireless communication over the Uu interface with a plurality of UEs also referred to as mobile terminals 110 located in the coverage of the respective Node B 108. Moreover, the RNC 106 in the mobile telecommunication system comprises a second CN 150, a circuit switched CN. The circuit switched CN 150 comprises a Mobile Switching Centre (MSC) (not shown) connected to a Gateway MSC (not shown). The Gateway MSC is further connected to other external networks 130, 140 such as the PSTN. The circuit switched CN may also comprise registers (not shown) such as a Visitor Location Register and a Home Location Register.

According to the present invention, the network comprises means for creating or updating a list L1 for each cell defined in a network. The list L1 is illustrated in FIG. 2. The list L1 for a cell A comprises cells not defined as neighbouring cells to the cell A and the cells in the list L1 are grouped based on their scrambling codes according to FIG. 2. As an example, the order of cells in the list L1 may be based on the geographical position. In a first embodiment of the present invention the cell closest to the current cell is placed in the first position of the list L1. According to other embodiments, the order of the cells is in a random order or in any other way that benefits the system behaviour. In order to minimize the length of the list L1, it may be limited with regards to a geographical area.

An initial list L1 is predefined in the RNC and the identities of the cells of list L1 are known. When the list L1 is updated, the following procedure is applied in the RNC. This procedure is repeated for each new received measurement report.

1. A measurement report is received from a mobile terminal comprising at least one measurement on a reported cell.

2. A check is performed in order to investigate whether the at least one reported cell is defined as a neighbour to any cell in the AS of said mobile terminal.

3. If the reported cell is already defined as a neighbour to any cell in the AS of said mobile terminal according to the CELL_INFO_LIST, the cell is added to the active set as normal. It should be noted that the cells of the CELL_INFO_LIST in the mobile terminal are preferably neighbouring cells to the AS cells of the mobile terminal, but the CELL_INFO_LIST may also comprise other cells.

4. If said cell is not defined as neighbouring cell to any cell in the AS the cell is a detected set cell. Therefore, the cell identity of the reported cell is not always known and the network does not know which of the cell in the list L1 that corresponds to the reported cell. According to the present invention, a temporary neighbour relation is created between a cell X in list L1 with equal scrambling code as the reported cell and one or more of the cells in the active set of said mobile terminal. The cell X is preferably located in a first position in the list L1. This implies that the network assumes that the reported cell corresponds to the cell X. The cell X in the list L1 having a temporary relation is further denoted temporary neighbour. If more than one cell in the report is not is defined as neighbour, the scrambling code of the strongest received cell may be used to choose a cell in list L1 for the temporary neigbour relation. It is however possible to use any other cell than the strongest cell.

The cell X defined as a temporary neighbour is added to the active set. The network transmits a message "active set update" to the mobile terminal that reported the cell/s in the detected set. This message is an existing message comprising the scrambling code of the cells in the active set.

The mobile terminal within said AS is now aware of that it is allowed to use this added cell X. Thus, the cell X defined as a temporary cell may be used by the mobile terminal connected to the AS.

5. The network then monitors the connection and detects if uplink synchronisation of the added cell X is achieved.

6. If uplink synchronisation is not achieved, the cell is not regarded as a neighbour and is put in a specific position in the list L1, e.g. in the last position of the list L1. The cell may be kept in the AS until the network receives reports from the mobile terminal that the cell is not strong enough, or another alternative is to remove the cell from the AS after a predefined time if synchronization is not achieved.

7. If uplink synchronisation is achieved, the cell X is a valid neighbouring cell for the mobile terminal and the temporary neighbour relation is hence converted into a permanent relation. It is thus confirmed that the reported cell is the cell X and the identity of the cell is known.

8. When the uplink synchronisation is achieved and the cell is converted into a permanent neighbour, the added cell is removed from the list L1.

Figure 3:
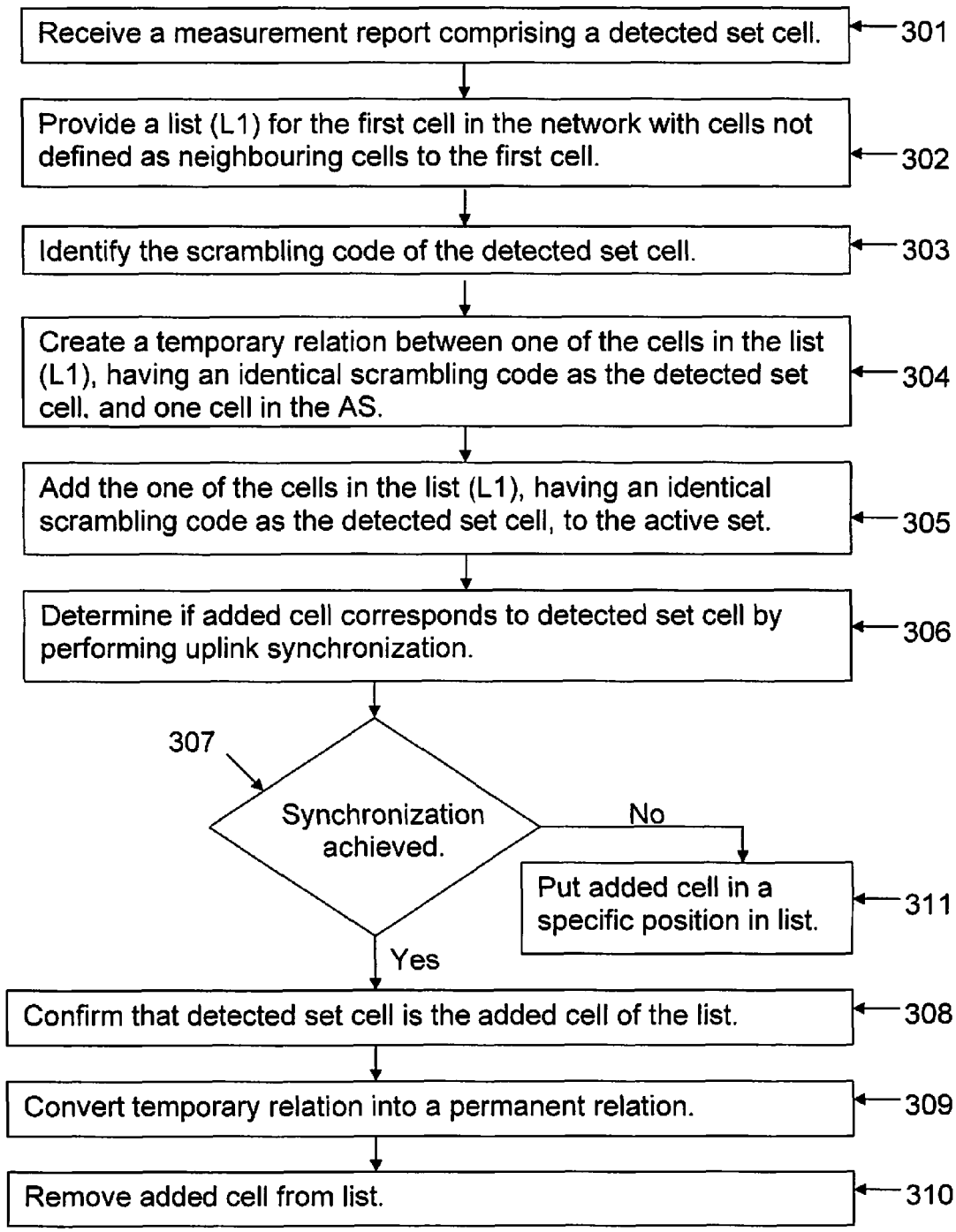
FIG. 3 illustrates schematically a flowchart according to the present invention.

To summarize, the method in a Radio Network Controlling unit such as an RNC for including a detected set cell, i.e. a cell not already defined by the system, in an active set, i.e. the set comprising the base stations simultaneously connected to the same mobile terminal in soft handover is illustrated in FIG. 3. The method comprises the steps of:

301. Receive a measurement report comprising a detected set cell from a mobile terminal located in a first cell.

302. Provide a list (L1) for the first cell in the network with cells not defined as neighbouring cells to the first cell, wherein the cells in the list (L1) are grouped based on their scrambling codes.

303. Identify the scrambling code of the detected set cell.

304. Create a temporary relation between one of the cells in the list (L1), having an identical scrambling code as the detected set cell, and one cell in the AS;

305. Add the one of the cells in the list (L1), having an identical scrambling code as the detected set cell, to the active set.

306. Determine if the added cell in the list corresponds to the detected set cell by performing uplink synchronization.

307. If uplink synchronization is achieved, then:
    308. Confirm that the detected set cell is the added cell of the list;
    309. Convert the temporary relation into a permanent relation; and,
    310. Remove the added cell from the list.

311. If uplink synchronisation is not achieved, then put the added cell in a specific position of the list.

The method above may be implemented by a computer program product. The computer program product is directly loadable into the internal memory of a computer within a Radio Network Controller in a mobile telecommunication network, and comprises the software code portions for performing the steps of said method. Furthermore, the computer program product is stored on a computer usable medium, and comprises readable program for causing a computer, within a Radio Network Controller in a mobile telecommunication system, to control an execution of the steps of said method.

Thus, the Radio Network Controlling unit, such as a RNC, in accordance with the present invention comprises means for receiving a measurement report comprising a detected set cell from a mobile terminal located in a first cell; means for providing a list (L1) for the first cell in the network with cells not defined as neighbouring cells to the first cell, wherein the cells in the list (L1) are grouped based on their scrambling codes; means for identifying the scrambling code of the detected set cell; means for creating a temporary relation between one of the cells in the list (L1), having an identical scrambling code as the detected set cell, and one cell in the AS; and means for adding the one of the cells in the list (L1), having an identical scrambling code as the detected set cell, to the active set.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A method in a Radio Network Controlling unit in a mobile telecommunication network for including a detected set cell in an active set, wherein said detected set cell is a cell not identified by the network and said active set is the set comprising the base stations simultaneously connected to the same mobile terminal in soft handover, said method comprising the steps of:
   receiving a measurement report comprising a detected set cell from a mobile terminal located in a first cell;
   providing a list for the first cell in the network with cells not defined as neighboring cells to the first cell, wherein the cells in the list are grouped based on their scrambling codes;
   identifying the scrambling code of the detected set cell;
   creating a temporary relation between one of the cells in the list having an identical scrambling code as the detected set cell and one cell in the AS;
   adding the one of the cells in the list having an identical scrambling code as the detected set cell to the active set;
   determining if the added cell in the list corresponds to the detected set cell by performing uplink synchronization and, if uplink synchronization is achieved:
      confirming that the detected set cell is the added cell of the list;
      converting the temporary relation into a permanent relation; and,
      removing the added cell from the list; and,
   if uplink synchronisation is not achieved, putting the added cell in a specific position of the list.

2. The method according to claim 1, wherein the temporary relation is created between a cell in the list having an identical scrambling code as the strongest detected set cell, and one cell in the AS.

3. The method according to claim 1, further comprising the step of informing the mobile terminal in soft handover about the added cell to the active set by transmitting a message comprising the scrambling code of the cells in the active set.

4. A Radio Network Controller (RNC) in a mobile telecommunication network adapted for including a detected set cell in an active set, wherein said detected set cell is a cell not identified by the network and said active set is the set comprising the base stations simultaneously connected to the same mobile terminal in soft handover, said RNC comprising:
   means for receiving a measurement report comprising a detected set cell from a mobile terminal located in a first cell;
   means for providing a list for the first cell in the network with cells not defined as neighboring cells to the first cell, wherein the cells in the list are grouped based on their scrambling codes;
   means for identifying the scrambling code of the detected set cell;
   means for creating a temporary relation between one of the cells in the list having an identical scrambling code as the detected set cell, and one cell in the AS; and,
   means for adding the one of the cells in the list having an identical scrambling code as the detected set cell to the active set;
   means for determining if the added cell in the list corresponds to the detected set cell by performing uplink synchronization;
   means for confirming that the detected set cell is the added cell of the list if uplink synchronization is achieved;
   means for converting the temporary relation into a permanent relation;
   means for removing the added cell from the list; and,
   means for putting the added cell in a specific position of the list if uplink synchronization is not achieved.

5. The RNC according to claim 4, further comprising means for creating the temporary relation between a cell in the list having an identical scrambling code as the strongest detected set cell and one cell in the AS.

6. The RNC according to claim 4, further comprising means for informing the mobile terminal in soft handover about the added cell to the active set by transmitting a message comprising the scrambling code of the cells in the active set.

* * * * *